United States Patent
Kim et al.

(10) Patent No.: US 12,063,982 B2
(45) Date of Patent: Aug. 20, 2024

(54) METHOD OF CONTROLLING TEMPERATURE OF HEATER OF AEROSOL GENERATING DEVICE BASED ON HUMIDITY AND TEMPERATURE

(71) Applicant: KT&G CORPORATION, Daejeon (KR)

(72) Inventors: Yong Hwan Kim, Anyang-si (KR); Dae Nam Han, Seoul (KR); Sung Wook Yoon, Suwon-si (KR); Seung Won Lee, Gwangmyeong-si (KR)

(73) Assignee: KT&G CORPORATION, Daejeon (KR)

( * ) Notice: Subject to any disclaimer, the term of this patent is extended or adjusted under 35 U.S.C. 154(b) by 553 days.

(21) Appl. No.: 17/415,308

(22) PCT Filed: Dec. 16, 2020

(86) PCT No.: PCT/KR2020/018436
§ 371 (c)(1),
(2) Date: Jun. 17, 2021

(87) PCT Pub. No.: WO2021/157850
PCT Pub. Date: Aug. 12, 2021

(65) Prior Publication Data
US 2022/0400773 A1    Dec. 22, 2022

(30) Foreign Application Priority Data
Feb. 6, 2020    (KR) .................. 10-2020-0014350

(51) Int. Cl.
*A24F 40/40*    (2020.01)
*A24F 40/20*    (2020.01)
(Continued)

(52) U.S. Cl.
CPC .............. *A24F 40/57* (2020.01); *A24F 40/40* (2020.01); *A24F 40/51* (2020.01)

(58) Field of Classification Search
CPC .......... A24F 40/20; A24F 40/40; A24F 40/51; A24F 40/57; H04Q 9/00; H05B 1/0227
See application file for complete search history.

(56) References Cited

U.S. PATENT DOCUMENTS 11,013,872 B2    5/2021    Silvestrini et al.
11,896,058 B2 *  2/2024    Bessant ................... A24F 40/57
(Continued)

FOREIGN PATENT DOCUMENTS

KR    10-2012-0089544 A    8/2012
KR    10-2012-0094400 A    8/2012
(Continued)

OTHER PUBLICATIONS

European Search Report dated Feb. 10, 2022 in European Application No. 20897627.4.
(Continued)

*Primary Examiner* — Abdullah A Riyami
*Assistant Examiner* — Thang H Nguyen
(74) *Attorney, Agent, or Firm* — Sughrue Mion, PLLC (57) ABSTRACT

Provided is a method of controlling a temperature of a heater of an aerosol generating device based on temperature and humidity. The method includes detecting an external temperature and an external humidity of the aerosol generating device; determining a temperature profile of the heater; outputting a plurality of adjustment values; determining an adjustment value from among the plurality of adjustment values based on a user input; fine-tuning the temperature profile based on the determined adjustment value; and controlling power supplied to the heater based on the fine-tuned temperature profile, wherein at least one of the
(Continued)

temperature profile and the plurality of adjustment values is determined based on at least of the external temperature and the external humidity.

13 Claims, 7 Drawing Sheets

(51) Int. Cl.
*A24F 40/51* (2020.01)
*A24F 40/57* (2020.01)

(56) References Cited

U.S. PATENT DOCUMENTS

| | | |
|---|---|---|
| 2005/0045179 A1 | 3/2005 | Faison, Jr. et al. |
| 2018/0043114 A1* | 2/2018 | Bowen ................. A61M 11/042 |
| 2018/0263289 A1* | 9/2018 | Qiu ......................... A24F 40/51 |
| 2019/0158938 A1* | 5/2019 | Bowen ................. A61M 11/042 |
| 2019/0289915 A1* | 9/2019 | Heidl ...................... G06F 3/016 |
| 2019/0380389 A1 | 12/2019 | Hong et al. |
| 2020/0305512 A1 | 10/2020 | Lim et al. |
| 2021/0084986 A1 | 3/2021 | Hepworth et al. |
| 2021/0145068 A1* | 5/2021 | Bessant .................. A24F 40/20 |

FOREIGN PATENT DOCUMENTS

| | | |
|---|---|---|
| KR | 10-2016-0098212 A | 8/2016 |
| KR | 10-2018-0085368 A | 7/2018 |
| KR | 10-2019-0051785 A | 5/2019 |
| KR | 10-2019-0119646 A | 10/2019 |
| KR | 10-2183093 B1 | 11/2020 |
| WO | 2019/115464 A1 | 6/2019 |
| WO | 2019/206916 A1 | 10/2019 |
| WO | 2020/008008 A1 | 1/2020 |
| WO | 2020/011815 A2 | 1/2020 |
| WO | 2020/020796 A1 | 1/2020 |
| WO | WO-2023195696 A1 * | 10/2023 |

OTHER PUBLICATIONS

Korean Office Action for Korean application 10-2020-0014350 dated May 17, 2021.
Office Action dated Nov. 22, 2022 issued by the Japanese Patent Office in Japanese Application No. 2021-534346.
Office Action dated Apr. 6, 2023 in Chinese Application No. 202080008957.4.
International Search Report dated Jun. 2, 2021, issued by the International Searching Authority in application No. PCT/KR2020/018436.

* cited by examiner

METHOD OF CONTROLLING TEMPERATURE OF HEATER OF AEROSOL GENERATING DEVICE BASED ON HUMIDITY AND TEMPERATURE

TECHNICAL FIELD

The present disclosure relates to a method and an apparatus for controlling a temperature of a heater of an aerosol generating device based on temperature and humidity, and more particularly, to a method and an apparatus for using information regarding temperature and humidity detected by a sensor in controlling a temperature of a heater of an electronic cigarette.

BACKGROUND ART

Recently, the need for an alternative to traditional cigarettes has increased. For example, there is growing demand for an aerosol generating device that generates an aerosol by heating an aerosol generating material in cigarettes, rather than by combusting cigarettes. Accordingly, research into a heating-type cigarette and a heating-type aerosol generator has been actively conducted.

An aerosol generated from an aerosol generating device may provide a different smoking sensation to a user each time, depending on a surrounding environment in which the aerosol is generated. For example, in an extremely low ambient temperature, unless a main controller of an aerosol generating device uses a special temperature profile to control a temperature of a heater, the temperature of the heater of the aerosol generating device does not properly increase. In this case, an aerosol may not be easily generated, or the composition of the aerosol becomes different, and thus, the user may feel a different smoking sensation when inhaling the aerosol from the aerosol generating device.

As described above, research has been conducted to provide consistent smoking satisfaction to a user even if there are various environmental changes by making changes to a temperature profile in consideration of a surrounding environment.

DISCLOSURE

Technical Problem

Technical problems to be solved by the present disclosure are to improve an aerosol generating device that does not reflect a change in a surrounding temperature and humidity.

Technical Solution

According to an aspect of the present disclosure, a method includes detecting an external temperature and an external humidity of the aerosol generating device; determining a temperature profile of the heater; outputting a plurality of adjustment values; determining an adjustment value from among the plurality of adjustment values based on a user input; fine-tuning the temperature profile based on the determined adjustment value; and controlling power supplied to the heater based on the fine-tuned temperature profile, wherein at least one of the temperature profile and the plurality of adjustment values is determined based on the external temperature or the external humidity.

According to another aspect of the present disclosure, a device includes a receiver configured to obtain an external temperature and an external humidity of the aerosol generating device; a profile determiner configured to determine a temperature profile of a heater; a fine-tuner configured to output a plurality of adjustment values, determine an adjustment value from among the plurality of adjustment values based on a user input, and fine-tune the determined temperature profile based on the determined adjustment value; and a power controller configured to control power supplied to the heater based on the fine-turned temperature profile, wherein at least one of the temperature profile and the plurality of adjustment values is determined according to the external temperature or the external humidity.

According to another aspect of the present disclosure, provided is a non-transitory computer-readable recording medium having recorded thereon a program for executing the method.

Advantageous Effects

According to one or more embodiments, an external temperature and an external humidity of a device may be detected, and an optimum aerosol may be generated based on the detected temperature and humidity.

Also, according to one or more embodiments, the user may be allowed to fine-tune a temperature of a heater, and thus, the user may customize an aerosol to the user's taste.

BEST MODE

According to one or more embodiments of the present disclosure, provided is a method of controlling a temperature of a heater of an aerosol generating device based on temperature and humidity, the method including detecting an external temperature and an external humidity of the aerosol generating device; determining a temperature profile of the heater; outputting a plurality of adjustment values; determining an adjustment value from among the plurality of adjustment values based on a user input; fine-tuning the temperature profile based on the determined adjustment value; and controlling power supplied to the heater based on the fine-tuned temperature profile, wherein at least one of the temperature profile and the plurality of adjustment values is determined based on the external temperature or the external humidity.

The determining of the temperature profile may include determining one of a plurality of temperature profiles according to a combination of the detected external temperature and humidity.

The fine-tuning may include determining the plurality of adjustment values that are output according to the combination of the detected external temperature and humidity.

The determining of the temperature profile may include determining the temperature profile according to the detected external temperature, and the fine-tuning may include determining the plurality of adjustment values that are output according to the detected external humidity.

The determining of the temperature profile may include determining the temperature profile according to the detected external humidity, and the outputting may include determining the plurality of adjustment values that are output according to the detected external temperature.

The outputting may include outputting the plurality of adjustment values in a range of about −2° C. to about 2° C. based on the detected external temperature being greater than a predetermined temperature.

The outputting may include outputting the plurality of adjustment values in a range of about −6° C. to about 6° C. based on the detected external temperature being in a predetermined range.

The outputting may include outputting the plurality of adjustment values in a range of about −10° C. to about 10° C. based on the external temperature being less than a predetermined temperature.

According to one or more embodiments of the present disclosure, provided is an aerosol generating device of controlling a temperature of a heater based on temperature and humidity, the aerosol generating device including: a receiver configured to obtain an external temperature and an external humidity of the aerosol generating device; a profile determiner configured to determine a temperature profile of a heater; a fine-tuner configured to output a plurality of adjustment values, determine an adjustment value from among the plurality of adjustment values based on a user input, and fine-tune the determined temperature profile based on the determined adjustment value; and a power controller configured to control power supplied to the heater based on the fine-turned temperature profile, wherein at least one of the temperature profile and the plurality of adjustment values is determined according to the external temperature or the external humidity.

The profile determiner may be configured to determine one of the plurality of temperature profiles according to a combination of the external temperature and humidity.

The fine-tuner may be configured to determine a plurality of adjustment values that are output according to a combination of the external temperature and humidity.

The profile determiner may be configured to determine a temperature profile according to the external temperature, and the fine-tuner may be configured to determine a plurality of adjustment values that are output according to the external humidity.

The profile determiner may be configured to determine a temperature profile according to the external humidity, and the fine-tuner may be configured to determine a plurality of adjustment values that are output according to the external temperature.

The fine-tuner may be configured to output the plurality of adjustment values in a range of about −2° C. to about 2° C. based on the detected external temperature being greater than a predetermined temperature.

The fine-tuner may be configured to output the plurality of adjustment values in a range of about −6° C. to about 6° C. based on the detected external temperature being in a predetermined range.

The fine-tuner may be configured to output the plurality of adjustment values in a range of about −10° C. to about 10° C. based on the detected temperature being less than a predetermined temperature.

According to one or more embodiments, provided is a non-transitory computer-readable recording medium having recorded thereon a program for executing the method.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, there are terms arbitrarily selected by the applicant in the specification, and the meaning of the terms will be described in detail. Therefore, the terms used in the present invention should be defined based on the meaning of the term and the overall contents of the present invention, not a simple name of the term.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The attached drawings for illustrating one or more embodiments are referred to in order to gain a sufficient understanding, the merits thereof, and the objectives accomplished by the implementation. The disclosure may, however, be embodied in many different forms and should not be construed as being limited to the embodiments set forth herein.

Hereinafter, embodiments of the present disclosure will be described in detail with reference to the drawings.

Figure 1:
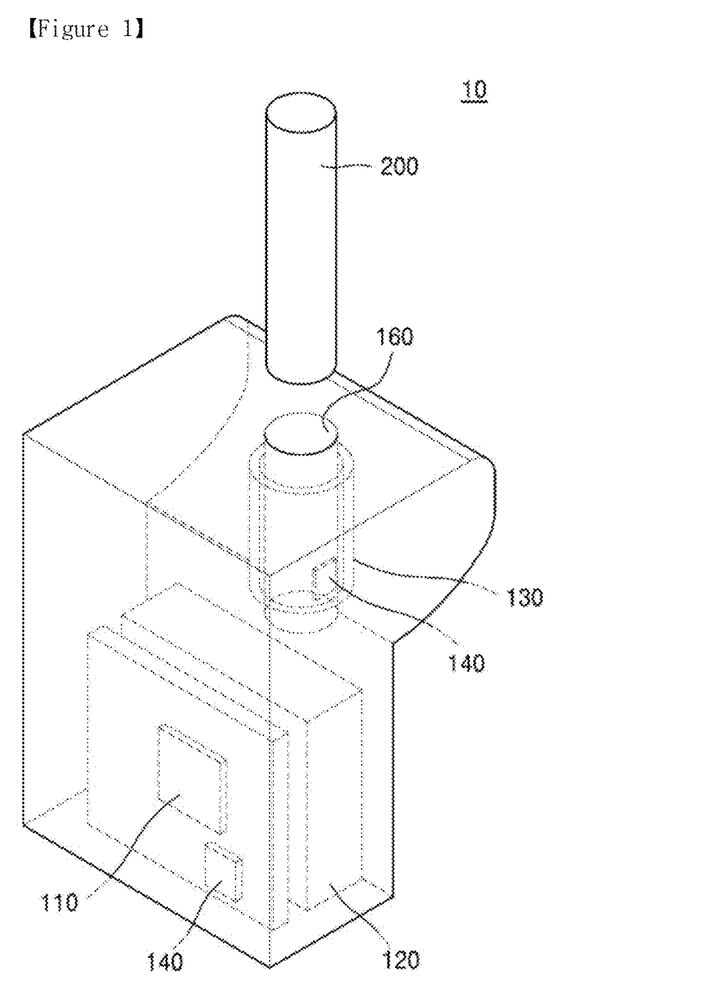
FIG. 1 is a schematic perspective view of an example of an aerosol generating device.

FIG. 1 is a schematic perspective view of an example of an aerosol generating device.

Referring to FIG. 1, an aerosol generating device 10 may include a controller 110, a battery 120, a heater 130, and a temperature/humidity sensor 140. FIG. 1 show some components of the aerosol generating device 10 for convenience of description, and additional components may be added to the aerosol generating device 10 according to embodiments without departing from the scope of the inventive concept. Also, an internal structure of the aerosol generating device 10 is not limited to the illustration of FIG. 1, and according to an embodiment or a design, the arrangements of the controller 110, the battery 120, the heater 130, the temperature/humidity sensor 140, and the aerosol cigarette 200 may differ.

The aerosol generating device 10 of FIG. 1 includes an insertion hole 160 into which the cigarette 200 is inserted. For example, the cigarette 200 may be of a general stick type. After being inserted into the insertion hole 160 of the aerosol generating device 10, the cigarette 200 is heated by the heater 130 so that an aerosol is generated. The aerosol generated in the cigarette 200 passes through a filter, etc. included in the cigarette 200 when the user inhales, and the aerosol is transmitted to the user.

The controller 110 may include a micro-controller unit (MCU) that controls overall operations of the aerosol generating device 10 in response to control signals. In detail, the controller 110 may control operations of other components included in the aerosol generating device 10 in addition to the battery 120 and the heater 130. Also, the controller 110 may identify a state of each component of the aerosol generating device 10 and determine whether the aerosol generating device 10 is operable.

The controller 110 may include at least one processor. A processor can be implemented as an array of a plurality of logic gates or can be implemented as a combination of a general-purpose microprocessor and a memory in which a program executable in the microprocessor is stored. Also, it may be understood by one of ordinary skill in the art that the controller 110 may be implemented as another type of hardware.

The battery 120 may supply power used when the aerosol generating device 10 operates. For example, the battery 120 may supply power to heat the heater 130 and power necessary to drive the controller 110. Also, the battery 120 may supply power necessary to drive a display, a sensor, a motor, etc. of the aerosol generating device 10.

The heater 130 may be heated by power supplied from the battery 120. For example, when the cigarette 200 is inserted into the aerosol generating device 10, the heater 130 may be disposed outside the cigarette 200. Therefore, the heated heater 130 may increase a temperature of an aerosol generating material of the cigarette 200.

The heater 130 may be an electric resistance heater. For example, the heater 130 may include an electrically conductive track, and as a current flows therein, the heater 130 may be heated. However, the heater 130 is not limited thereto, and there is no limitation in the heater 130 when the heater 130 may be heated to a desired temperature. Here, the desired temperature may be set in advance in the aerosol generating device 10 or by the user.

As another example, the heater 130 may be an induction heating heater. In detail, the heater 130 may include an electroconductive coil for heating the cigarette 200 in an induction heating manner, and the cigarette may include a susceptor that may be heated by the induction heating heater.

For example, the heater 130 may include a pipe-type heating element, a sheet-type heating element, a pin-type heating element, or a bar-type heating element, and according to a shape of the heating element, the heater 130 may heat the inside or outside of the cigarette 200.

Also, there may exist a plurality of heaters 130 in the aerosol generating device 10. In this case, the heaters 130 may be inserted into the cigarette 200 or may be disposed outside the cigarette 200. Also, some of the heaters 130 may be inserted into the cigarette 200, and others thereof may be disposed outside the cigarette 200. Also, a shape of the heater 130 is not limited thereto and may vary.

The temperature/humidity sensor 140 may detect an external temperature and an external humidity of the aerosol generating device 10 and provide a detection result to the controller 110. The temperature/humidity sensor 140 may be a single sensor capable of detecting both the temperature and humidity, or may be implemented by a temperature sensor and a humidity sensor which are physically or logically combined. For example, the temperature/humidity sensor 140 may be implemented by a Resistance Temperature Detector (RTD) sensor and a capacitance humidity sensor, but embodiments are not limited thereto.

The cigarette 200 may be mounted on the aerosol generating device 10 and heated by the heater 130 such that the aerosol is generated. Each component of the cigarette 200 will be described with reference to FIG. 3.

Figure 2:
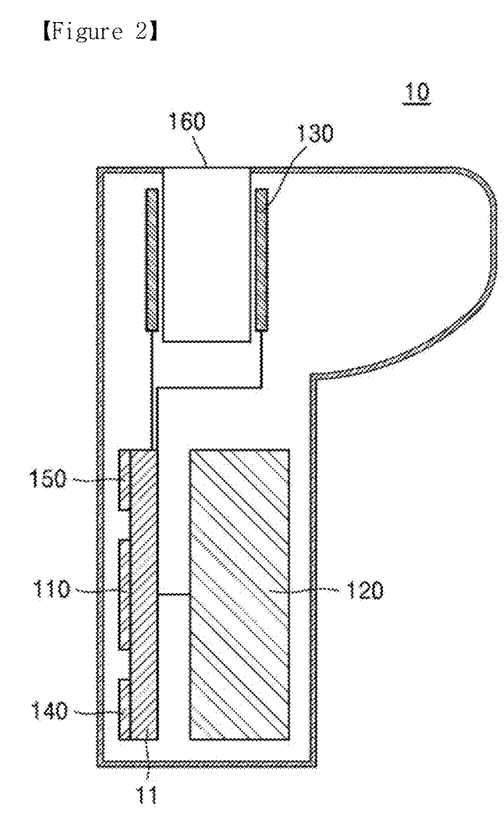
FIG. 2 is a block diagram of an aerosol generating device according to an embodiment.

FIG. 2 is a block diagram of an example of an aerosol generating device.

Referring to FIG. 2, the aerosol generating device 10 may include a Printed Circuit Board (PCB) 11, the controller 110, the battery 120, the heater 130, the temperature/humidity sensor 140, a display 150, and the insertion hole 160. Hereinafter, the descriptions that are already provided with reference to FIG. 1 will be omitted.

The PCB 11 may communicate with the controller 110 and electrically combine various components that collect information of the aerosol generating device 10. On a surface of the PCB 11, the controller 110, the temperature/humidity sensor 140, and the display 150 may be mounted. The battery 120 for supplying power to components, which are connected to the PCB 11, is connected to the PCB 11.

The temperature/humidity sensor 140 may be surface-mounted on the PCB 11, detect an external temperature and an external humidity of the aerosol generating device 10, and transmit a detection result to the controller 110. The temperature/humidity sensor 140 may be mounted on the PCB 11 or may be disposed adjacent to the insertion hole 160 according to embodiments.

The display 150 may visually output information, which is necessary for the user from among information generated in the aerosol generating device 10, and controls information to be displayed on a display panel (e.g., LCD panel or an LED panel) disposed on a front surface of the aerosol generating device 10, based on information received from the controller 110.

The insertion hole 160 may refer to a cavity into which the cigarette 200 may be inserted. When the cigarette 200 is inserted into the insertion hole 160, the aerosol may be generated as the heater 130, which is adjacent to the insertion hole 160, is heated. According to the sensitivity of the temperature/humidity sensor 140, the temperature/humidity sensor 140 may not be mounted on the PCB 11 and may be disposed adjacent to the insertion hole 160.

Figure 3:
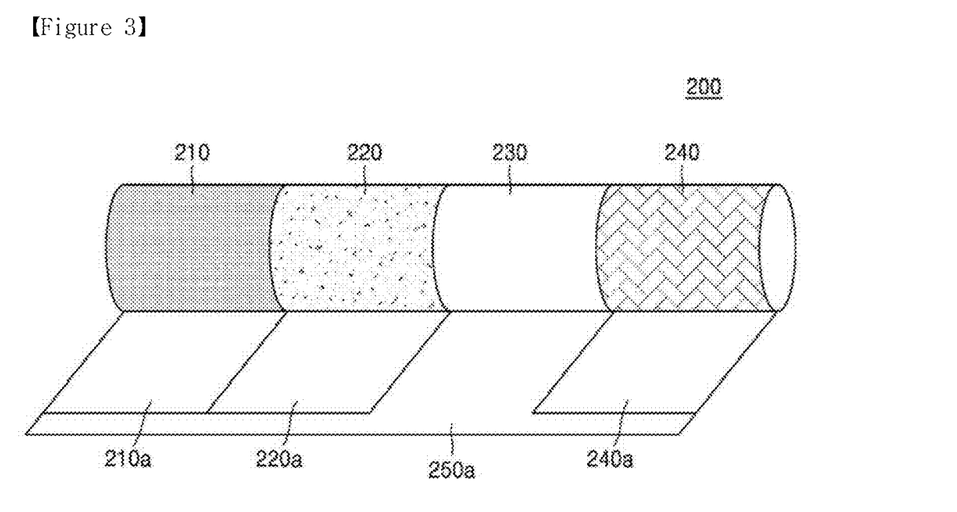
FIG. 3 is a drawing illustrating a cigarette according to an embodiment.

FIG. 3 is a drawing illustrating an example of a cigarette.

A cigarette 200 which is accommodated in an aerosol generating device 10 according to one or more embodiments may also be referred to as an aerosol generating article. The cigarette 200 may include a plurality of aerosol generating substrates, and may include different aerosol generating substrates for respective segments.

Referring to FIG. 3, the cigarette 200 includes a first segment 210 and a second segment 220, and different aerosol generating substrates are included in the respective segments 210 and 220. For convenience of description, FIG. 3 illustrates merely the first segment 210 and the second segment 220 including aerosol generating substrates, and a third segment 230 and a fourth segment 240 including materials do not generate an aerosol when heated. However, the number of aerosol generating substrates included in the cigarette 200 are not limited thereto. Thus, three or more segments may include aerosol generating substrates according to embodiments.

The first segment 210 of the cigarette 200 may include a first substrate for providing a user with a first smoking sensation by generating an aerosol. As an example, the first segment 210 of the cigarette 200 may be at least one of glycerin, propylene glycol, ethylene glycol, dipropylene glycol, diethylene glycol, triethylene glycol, tetraethylene glycol, and oleyl alcohol but is not limited thereto. An aerosol generating substrate included in the first segment 210 functions as an element for increasing smoking satisfaction of a user by increasing the amount of glycerin transfer of an aerosol.

The second segment 220 of the cigarette 200 may include a second substrate for providing the user with a second smoking sensation by generating an aerosol. As an example, the second segment 220 of the cigarette 200 may be a medium for generating nicotine and may be tobacco including nicotine. The tobacco included in the second segment 220 may be cut tobacco which is manufactured in the form of a sheet or a strand. An aerosol generating substrate included in the second segment 220 function as another element for increasing smoking satisfaction of the user by increasing the amount of nicotine transfer of an aerosol.

According to one or more embodiments of the present disclosure, the first segment 210 and the second segment 220 are heated by the heater 130, and the aerosol generating substrates included in the first segment 210 and the second segment 220 may be heated to form a first gas and a second gas, respectively.

The first gas and the second gas are mixed to finally become an aerosol that the user inhales. Since a vaporization temperature of the first substrate included in the first segment 210 is higher than a vaporization temperature of the second substrate included in the second segment 220, depending on embodiments, the depth of a cigarette insertion hole may be formed such that only the first segment 210 is heated by the heater 130 while the second segment 220 is indirectly heated or partially heated by the heated first segment 210. The second segment 220 serves as a filter to reduce the first gas generated from the first segment 210 to an appropriate amount, and serves to provide the user with a smooth smoking sensation.

The first segment 210 and the second segment 220 are individually surrounded by a wrapper. Referring to FIG. 3, the first segment 210 and the second segment 220 are surrounded by the first segment wrapper 210a and second segment wrapper 220a, respectively. Particular patterns may be engraved on outer surfaces of the first segment wrapper 210a and the second segment wrapper 220a, and may be detected by a cigarette recognition sensor that will be described later. Also, according to one or more embodiments, the first segment wrapper 210a and the second segment wrapper 220a may respectively surround the first segment 210 and the second segment 220 and then may be additionally surrounded by aluminum foil paper.

The third segment 230 of the cigarette may be a cooling unit. The third segment 230 may enable a user to puff an aerosol of a temperature at which the user may puff without difficulty, by cooling aerosols generated in the first segment 210 and the second segment 220 at an appropriate temperature. As an example, the third segment 230 may be manufactured by adding a plasticizer to a cellulose acetate tow and may be a tube-type structure having a hollow inside.

The fourth segment 240 of the cigarette may be a filter unit. The fourth segment 240 may be manufactured by adding a plasticizer to a cellulose acetate tow. Also, the fourth segment 240 may be formed to generate a flavor. As an example, a flavored liquid may be injected onto the fourth segment 240 or an additional fiber coated with a flavored liquid may be inserted into the fourth segment 240.

Also, the fourth segment 240 may include at least one capsule having a configuration in which a liquid including a flavoring material is wrapped with a film. The capsule may have a spherical or cylindrical shape and may burst by application of preset or higher pressure by the user before or while smoking starts, thereby enabling the user to puff a flavored aerosol. Like the first segment 210 and the second segment 220, the fourth segment 240 may also be surrounded by wrapper. As an example, polylactic aid wrapper may be used as fourth segment wrapper 240a.

The cigarette 200 may further include an outer shell 250a to surround all of the first segment 210 to fourth segment 240, and the outer shell 250a processed with a material having high thermal conductivity may be used to further increase the efficiency in which the thermal energy of the heater 240 is transferred to the cigarette 300.

Figure 4:
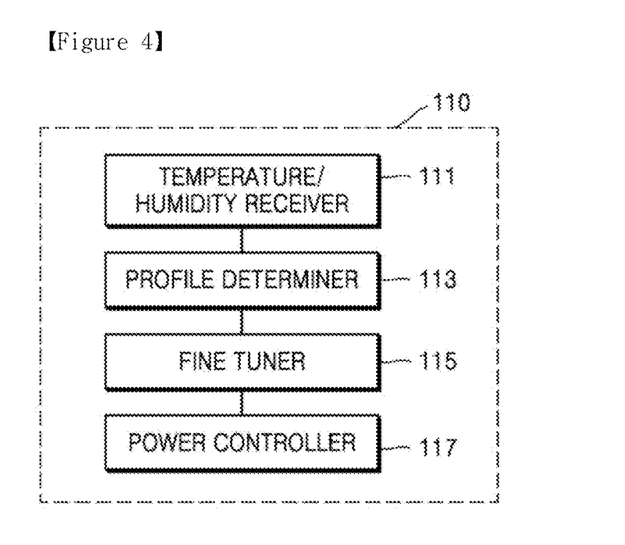
FIG. 4 is a block diagram of a controller according to an embodiment.

FIG. 4 is a block diagram of components included in the controller.

Referring to FIG. 4, the controller 110 may include a temperature/humidity receiver 111, a profile determiner 113, a fine tuner 115, and a power controller 117. FIG. 4 shows some components for implementing an embodiment, and thus, according to an embodiment, the controller 110 may include other components in addition to the temperature/humidity receiver 111, the profile determiner 113, the fine tuner 115, and the power controller 117. Hereinafter, the detailed descriptions will be provided with reference to FIGS. 1, 2, and 4.

The temperature/humidity receiver 111 may receive, from the temperature/humidity sensor 140, an external temperature value and an external humidity value detected by the temperature/humidity sensor 140. For example, the temperature/humidity receiver 111 may receive a result detected by the temperature/humidity sensor 140, and the controller 110 may determine that a current temperature outside the aerosol generating device 10 is 10 degrees Celsius and current humidity is 65%.

The profile determiner 113 determines a temperature profile for the heater 130. The temperature profile indicates information about how to control a temperature of a heater over time. The controller 110 may read one of the temperature profiles stored in the memory and control the power supplied to the heater 130 according to the read temperature profile. Based on how the power supplied to the heater 130 is controlled, a flavor of the aerosol, which is generated as the heater 130 is heated, may differ. For example, the user smoking on the aerosol generating device 10 may feel a soft or deep impression according to a temperature profile.

In an embodiment, the profile determiner 113 may determine one of temperature profiles according to a combination of the temperature and humidity detected by the temperature/humidity sensor 140.

TABLE 1

| RESULT OF DETECTING | DETERMINED TEMPERATURE |
|---|---|
| HIGH TEMPERATURE AND HIGH HUMIDITY | TEMPERATURE PROFILE 1 |
| HIGH TEMPERATURE AND MEDIUM | TEMPERATURE PROFILE 2 |
| HIGH TEMPERATURE AND LOW HUMIDITY | TEMPERATURE PROFILE 3 |
| ROOM TEMPERATURE AND HIGH HUMIDITY | TEMPERATURE PROFILE 4 |
| ROOM TEMPERATURE AND MEDIUM | TEMPERATURE PROFILE 5 |
| ROOM TEMPERATURE AND LOW HUMIDITY | TEMPERATURE PROFILE 6 |
| LOW TEMPERATURE AND HIGH HUMIDITY | TEMPERATURE PROFILE 7 |
| LOW TEMPERATURE AND MEDIUM | TEMPERATURE PROFILE 8 |
| LOW TEMPERATURE AND LOW HUMIDITY | TEMPERATURE PROFILE 9 |

Table 1 shows correspondence between the sensing results of the external temperature/humidity and the temperature profiles. Referring to Table 1, the profile determiner 113 may classify the detected temperature into a high temperature, a room temperature, and a low temperature, and also classify the detected humidity into high humidity, medium humidity, and low humidity. As temperatures and humidity each are classified into three categories as stated above, types of temperature profiles, which are generated according to combinations of the temperatures and humidity, may be nine in total. According to an embodiment, the profile determiner 113 may classify the sensing results more finely, and types of the temperature profiles, which are generated according to the combinations of the temperatures and humidity, may be greater than nine. The profile determiner 113 may identify a result of detection by the temperature/humidity sensor 140, and according to the standards set in advance, the profile determiner 113 may determine which standards are close to an external temperature and an external humidity of the aerosol generating device 10. According to the above determination, when the combination of the external temperature and humidity is determined, the profile determiner 113 may select, from among temperature profiles stored in advance, a temperature profile corresponding to the determined combination of the temperature and humidity.

In another example, the profile determiner 113 may determine a temperature profile regardless of a combination of the temperature and humidity detected by the temperature/humidity sensor 140. In this case, the temperature profile is primarily determined by the profile determiner 113, and the combination of the temperature and humidity detected by the temperature/humidity sensor 140 is utilized in a process in which the determined temperature profile is secondarily fine-tuned by the user. The descriptions of the present embodiment will be described below with reference to the fine tuner 115 and FIG. 6.

In another embodiment, the profile determiner 113 may determine a temperature profile corresponding to a temperature value from among a temperature value and a humidity value detected by the temperature/humidity sensor 140. In this case, the temperature profile is primarily determined by the profile determiner 113 based on the temperature, and the humidity detected by the temperature/humidity sensor 140 may be utilized to determine an adjustment value for the process in which the determined temperature profile is secondarily fine-tuned by the user. The descriptions of the present embodiment will be described below with reference to the fine tuner 115 and FIG. 7.

In another embodiment different from the above embodiments, the profile determiner 113 may determine a temperature profile corresponding to the humidity value from among the temperature value and the humidity value detected by the temperature/humidity sensor 140. In this case, the temperature profile is primarily determined by the profile determiner 113 based on the humidity, and the temperature detected by the temperature/humidity sensor 140 may be utilized to determine an adjustment value in the process in which the determined temperature profile is secondarily fine-tuned by the user. The descriptions of the present embodiment will be described below with reference to the fine tuner 115 and FIG. 8.

The fine tuner 115 outputs adjustment values, and when an adjustment value is determined based on information input from the user, the fine tuner 115 fine-tunes a temperature profile in the determined adjustment value.

First of all, the fine tuner 115 allows the adjustment values to be output to the display 150 of the aerosol generating device 10. The user may identify, with naked eyes, the adjustment values that are output to the display 150 of the aerosol generating device 10, and then may select a certain adjustment value by using an input device.

When the adjustment value is determined in response to a user input, the fine tuner 115 may fine-tune the temperature profile, which is determined by the profile determiner 113, by the determined adjustment value. The fine tuning indicates that a minor change is made to a temperature profile that is already determined and is introduced in the present disclosure to enable the user to intervene in a series of processes for controlling a temperature of a heater and adjust a flavor of an aerosol generated in a device.

According to one or more embodiments of the present disclosure, the temperature and humidity detected by the temperature/humidity sensor 140 may be used in a process of determining a temperature profile and/or in a process of determining an adjustment value for fine-tuning the determined temperature profile.

In an embodiment, when the profile determiner 113 determines a temperature profile based on the combination of the temperature and the humidity detected by the temperature/humidity sensor 140, the fine tuner 115 may allow the user to select an adjustment value by outputting the adjustment values shown in Table 2. Hereinafter, unit of the adjustment values are assumed to be a degree in Celsius (° C.).

TABLE 2

| | Level 1 | Level 2 | Level 3 (default) | Level 4 | Level 5 |
|---|---|---|---|---|---|
| ADJUSTMENT UNIT GROUP | −2 | −1 | 0 | +1 | +2 |

Table 2 shows an example of adjustment values that are output from the aerosol generating device 10. In detail, Table 2 shows one adjustment value group, and the user may select one of adjustment values from Level 1 to Level 5. The fine tuner 115 may fine-tune the temperature profile that is determined by the profile determiner 113 based on the adjustment value (i.e., level) selected by the user. In another embodiment, the fine tuner 115 may determine the adjustment values based on combinations of the temperature and humidity detected by the temperature/humidity sensor 140. The present embodiment is different from the above embodiment in that both the temperature and the humidity detected by the temperature/humidity sensor 140 are used in determining the adjustment value.

TABLE 3

|  | Level 1 | Level 2 | Level 3 (default) | Level 4 | Level 5 |
|---|---|---|---|---|---|
| ADJUSTMENT UNIT GROUP | −2 | −1 | 0 | +1 | +2 |
| ADJUSTMENT UNIT GROUP | −1.9 | −0.95 | 0 | +0.95 | +1.9 |
| ADJUSTMENT UNIT GROUP | −1.8 | −0.90 | 0 | +0.90 | +1.8 |
| ADJUSTMENT UNIT GROUP | −1.7 | −0.85 | 0 | +0.85 | +1.7 |
| ADJUSTMENT UNIT GROUP | −1.6 | −0.80 | 0 | +0.80 | +1.8 |
| ADJUSTMENT UNIT GROUP | −1.5 | −0.75 | 0 | +0.75 | +1.5 |
| ADJUSTMENT UNIT GROUP | −1.4 | −0.70 | 0 | +0.70 | +1.4 |
| ADJUSTMENT UNIT GROUP | −1.3 | −0.65 | 0 | +0.65 | +1.3 |
| ADJUSTMENT UNIT GROUP | −1.2 | −0.60 | 0 | +0.60 | +1.2 |

Table 3 shows another example of adjustment values that are output from the aerosol generating device 10. In detail, Table 3 shows nine adjustment value groups, and similarly to Table 1, according to combinations of a high temperature, a room temperature, a low temperature, high humidity, medium humidity, and low humidity, one of the adjustment value groups may be actually output to the aerosol generating device 10. For example, the adjustment value group 1 may be output when the low temperature and low humidity are detected by the temperature/humidity sensor 140, and the adjustment value group 9 may be output when the high temperature and high humidity are detected. The present embodiment is different from the above embodiment in that gaps between the adjustment values may vary according to combinations of the temperature and humidity in the same adjustment value group. If the user selects one of five adjustment values included in an output adjustment value group, an adjustment value that is a criterion of the fine tuning may be determined.

In another embodiment, the fine tuner 115 may determine the adjustment values for the temperature profile determined by the profile determiner 113, based on the humidity detected by the temperature/humidity sensor 140. The present embodiment is different from the above embodiments in that the sensing results of the temperature/humidity sensor 140 are used in determining the temperature profile as well as in determining the adjustment value for fine-tuning the determined temperature profile.

TABLE 4

|  | Level 1 | Level 2 | Level 3 (default) | Level 4 | Level 5 |
|---|---|---|---|---|---|
| ADJUSTMENT UNIT GROUP 1 | −2 | −1 | 0 | +1 | +2 |
| ADJUSTMENT UNIT GROUP 2 | −6 | −3 | 0 | +3 | +6 |
| ADJUSTMENT UNIT GROUP 3 | −10 | −5 | 0 | +5 | +10 |

Table 4 shows another example of adjustment values that are output from the aerosol generating device 10. In detail, Table 4 shows three adjustment value groups, and one of the adjustment value groups may be actually output to the aerosol generating device 10. For example, the adjustment value group 3 may be output when the low temperature and low humidity are detected by the temperature/humidity sensor 140, and the adjustment value group 1 may be output when the high temperature and high humidity are detected. The present embodiment described with reference to Table 4 may be similarly applied to other embodiments in which the profile determiner 113 determines the temperature profile based on the humidity and the fine tuner 115 outputs the adjustment values based on the temperature, thus separate Tables and descriptions will be omitted.

The fine tuner 115 may fine-tune the temperature profile by the adjustment value that is determined in the above processes. For example, the highest temperature of the heater 130 may decrease to 250° C. or increase to 270° C. from 260° C., by the fine-tuning, and the variations may depend on the determined adjustment value. Also, Tables 2 to 4 show that the adjustment values have integer values for convenience of explanation. However, the adjustment values are not limited thereto. Further, the adjustment values may be calculated by a function of time, instead of being a constant in another embodiment.

The power controller 117 controls the power, which is supplied to the heater 130, based on the temperature profile that is fine-tuned by the fine tuner 115.

As described above, according to embodiments, at least one of the temperature profile and the adjustment value is determined according to the temperature or humidity detected by the temperature/humidity sensor 140, and thus, the aerosol may be generated by reflecting surrounding environmental factors of the aerosol generating device 10. The aerosol may provide uniform smoking satisfaction to the user.

Also, according to one or more embodiments of the present disclosure, the temperature profile, which is primarily determined, may be secondarily adjusted by the user, and thus, the user may get a new smoking experience. Here, an adjustment value selected by the user is not randomly selected, but is selected within a range (e.g., within an adjustment value group) that is experimentally determined by considering the ambient temperature and humidity. Thus, damage to the aerosol generating device 10 because of an indiscreet change by the user may be prevented.

The present disclosure is designed by considering the fact that a weight of a feature, which affects the smoking satisfaction of the user, differs according to climate features of an area where the aerosol generating device 10 is used. For example, a temperature difference of one-degree may greatly affect the atomization amount or smoking satisfaction in a high-temperature and high-humidity area, but may rarely affect the atomization amount or smoking satisfaction in a low-temperature area. According to one or more embodiments, an optimum aerosol, which may provide the highest satisfaction to the user, may be generated by considering characteristics of an area where the user currently stands.

Figure 5:
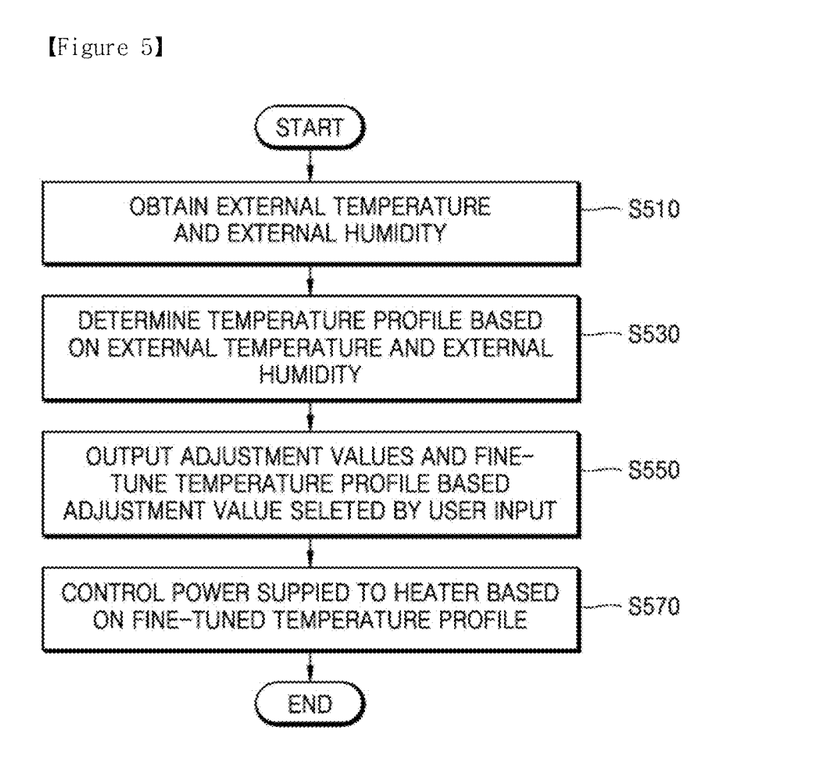
FIG. 5 is a flowchart of a method of controlling a temperature of a heater of an aerosol generating device, according to an embodiment.

FIG. 5 is a flowchart of a method of controlling a temperature of a heater of an aerosol generating device, according to an embodiment.

The method of FIG. 5 may be implemented by using the aerosol generating device 10 of FIG. 2 and the controller 110 of FIG. 4, and thus, the descriptions that are already provided with reference to FIGS. 2 and 4 will be omitted. The method will be described with reference to FIGS. 2, 4, and 5.

In operation S510, the temperature/humidity receiver 111 receives a value regarding an external temperature/humidity of the aerosol generating device 10 from the temperature/humidity sensor 140.

In operation S530, the profile determiner 113 determines a temperature profile of the heater according to a combination of the temperature and humidity detected by the temperature/humidity sensor 140.

In operation S550, the fine tuner 115 outputs adjustment values and fine-tunes the temperature profile, which is determined in operation S530, in response to a user input.

In operation S570, the power controller 117 controls the power supplied to the heater 130 according to the temperature profile that is fine-tuned in operation S550.

The method of FIG. 5 is also described in detail above with reference to Table 2.

Figure 6:
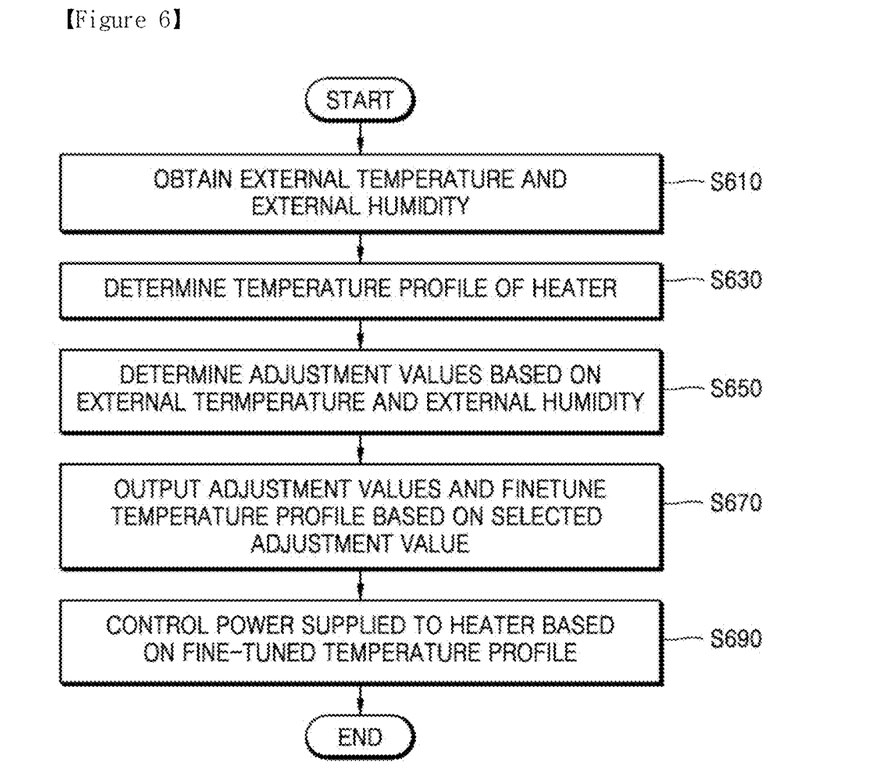
FIG. 6 is a flowchart of a method of controlling a temperature of a heater of an aerosol generating device, according to another embodiment.

FIG. 6 is a flowchart of a method of controlling a temperature of a heater of an aerosol generating device, according to another embodiment.

In operation S610, the temperature/humidity receiver 111 receives the value regarding the external temperature/humidity of the aerosol generating device 10 from the temperature/humidity sensor 140.

In operation S630, the profile determiner 113 determines the temperature profile of the heater by reading a memory or a database.

In operation S650, the fine tuner 115 determines the adjustment values to be output, according to the combination of the temperature and humidity.

In operation S670, the fine tuner 115 outputs the adjustment values, which are determined in operation S650, and fine-tunes the temperature profile, which is determined in operation S630, in response to the user input.

In operation S690, the power controller 117 controls the power supplied to the heater 130 according to the temperature profile that is fine-tuned in operation S670.

The method of FIG. 6 is also described in detail above with reference to Table 3.

Figure 7:
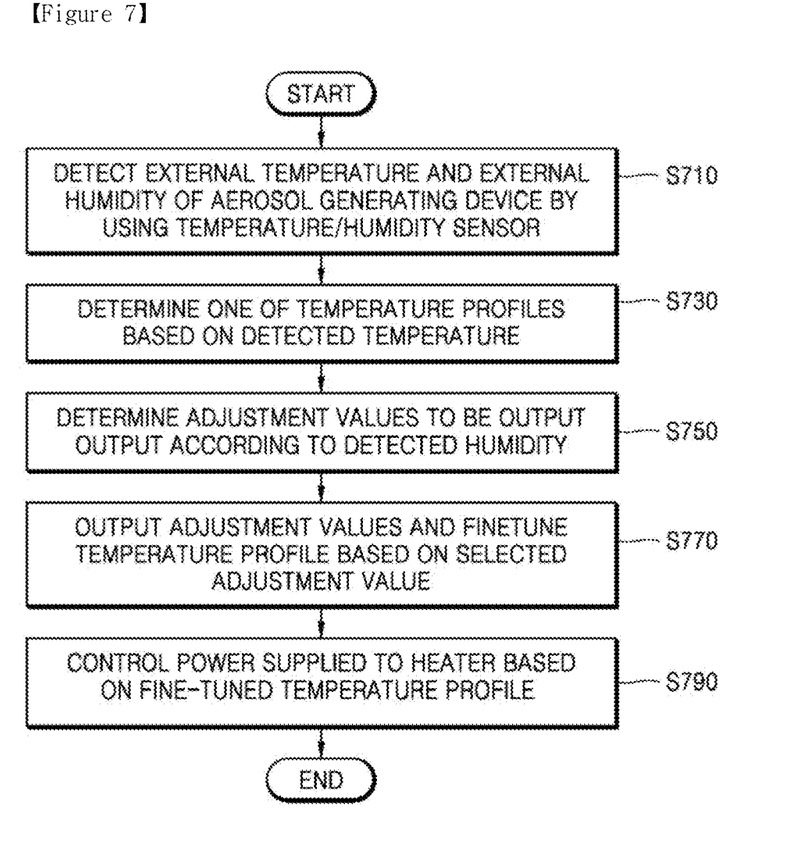
FIG. 7 is a flowchart of a method of controlling a temperature of a heater of an aerosol generating device, according to another embodiment.

FIG. 7 is a flowchart of a method of controlling a temperature of a heater of an aerosol generating device, according to another embodiment.

In operation S710, the temperature/humidity receiver 111 receives the value regarding the external temperature/humidity of the aerosol generating device 10 from the temperature/humidity sensor 140.

In operation S730, the profile determiner 113 determines the temperature profile of the heater according to the detected temperature.

In operation S750, the fine tuner 115 determines the adjustment values to be output, according to the detected humidity.

In operation S770, the fine tuner 115 outputs the adjustment values, which are determined in operation S750, and fine-tunes the temperature profile, which is determined in operation S730, by using the adjustment value selected in response to the user input.

In operation S790, the power controller 117 controls the power supplied to the heater 130 by using the temperature profile that is fine-tuned in operation S770.

Figure 8:
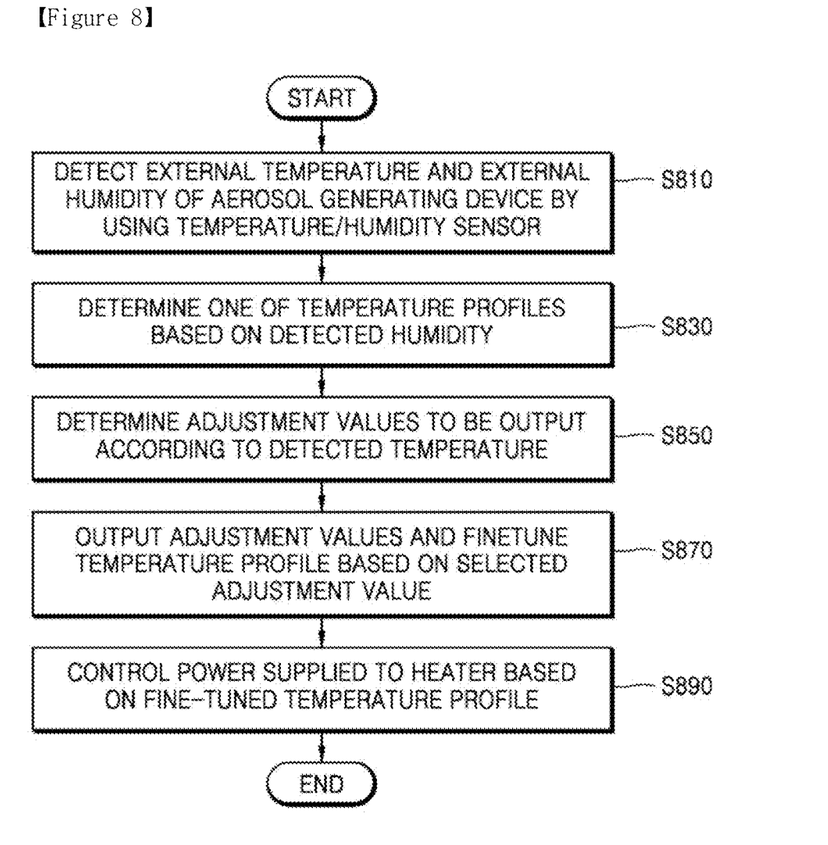
FIG. 8 is a flowchart of a method of controlling a temperature of a heater of an aerosol generating device, according to another embodiment.

FIG. 8 is a flowchart of a method of controlling a temperature of a heater of an aerosol generating device, according to another embodiment.

In operation S810, the temperature/humidity receiver 111 receives the value regarding the external temperature/humidity of the aerosol generating device 10 from the temperature/humidity sensor 140.

In operation S830, the profile determiner 113 determines the temperature profile of the heater according to the detected humidity.

In operation S850, the fine tuner 115 determines the adjustment values to be output, according to the detected temperature.

In operation S870, the fine tuner 115 outputs the adjustment values, which are determined in operation S850, and fine-tunes the temperature profile, which is determined in operation S830, by the adjustment value selected in response to the user input.

In operation S890, the power controller 117 controls the power supplied to the heater 130 by using the temperature profile that is fine-tuned in operation S870.

The methods of FIGS. 7 and 8 are also described in detail above with reference to Table 4.

The embodiments of the present disclosure may be implemented in the form of a computer program which may be executed on a computer via various types of components, and such a computer program may be recorded on a computer-readable recording medium. The medium may include a magnetic medium such as a hard disk, a floppy disk, and a magnetic tape, an optical recording medium such as CD-ROM and DVD, a magneto-optical medium such as a floptical disk, and a hardware device specifically configured to store and execute program instructions, such as ROM, RAM, and flash memory.

The computer program is specifically designed and configured for the present disclosure but may be known to and used by one of ordinary skill in the computer software field. Examples of the computer program may include a high-level language code which may be executed using an interpreter or the like by a computer, as well as a machine language code such as that made by a complier.

The specific implementations described in the present disclosure are example embodiments and do not limit the scope of the present disclosure in any way. For brevity of the specification, descriptions of existing electronic configurations, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of the present disclosure.

As used herein (in particular, in claims), use of the term "the" and similar indication terms may correspond to both singular and plural. When a range is described in the present disclosure, the present disclosure may include the invention to which individual values belonging to the range are applied (unless contrary description), and each individual value constituting the range is the same as being described in the detailed description of the disclosure. Unless there is an explicit description of the order of the steps constituting the method according to the present disclosure or a contrary description, the steps may be performed in an appropriate order. The present disclosure is not necessarily limited to the description order of the steps. The use of all examples or example terms (for example, etc.) is merely for describing the present disclosure in detail, and the scope of the present disclosure is not limited by the examples or the example terms unless the examples or the example terms are limited by claims. It will be understood by one of ordinary skill in the art that various modifications, combinations, and changes may be made according to the design conditions and factors within the scope of the appended claims or equivalents thereof.

At least one of the components, elements, modules or units (collectively "components" in this paragraph) represented by a block in the drawings, such as the controller 110, the temperature/humidity receiver 111, the profile determiner 113, the fine tuner 115, and the power controller 117, may be embodied as various numbers of hardware, software and/or firmware structures that execute respective functions described above, according to an embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

INDUSTRIAL APPLICABILITY

One or more embodiments of the present disclosure may be used to manufacture a next-generation electronic cigarette that sensitively reacts to external environmental factors.

The invention claimed is:

1. A method of controlling a temperature of a heater of an aerosol generating device, the method comprising:
   detecting an external temperature and an external humidity of the aerosol generating device, using at least one sensor; and
   using at least one processor:
      determining a temperature profile of the heater by determining one of a plurality of temperature profiles according to a combination of the external temperature and the external humidity;
      outputting a plurality of adjustment values;
      determining an adjustment value from among the plurality of adjustment values based on a user input;
      fine-tuning the determined temperature profile based on the determined adjustment value; and
      controlling power supplied to the heater based on the fine-tuned temperature profile,
   wherein at least one of the temperature profile and the plurality of adjustment values is determined based on at least one of the external temperature and the external humidity.

2. The method of claim 1, wherein the fine-tuning comprises determining the plurality of adjustment values according to the combination of the external temperature and the external humidity.

3. The method of claim 1, wherein the determining of the temperature profile comprises determining the temperature profile according to the external temperature, and
   the fine-tuning comprises determining the plurality of adjustment values that are output according to the external humidity.

4. The method of claim 1, wherein
   the determining of the temperature profile comprises determining the temperature profile according to the external humidity, and
   the outputting comprises determining the plurality of adjustment values according to the external temperature.

5. The method of claim 1, wherein the outputting comprises outputting the plurality of adjustment values in a range of about −2° C. to about 2° C. based on the external temperature being greater than a predetermined temperature.

6. The method of claim 1, wherein the outputting comprises outputting the plurality of adjustment values in a range of about −6° C. to about 6° C. based on the external temperature being in a predetermined range.

7. The method of claim 1, wherein the outputting comprises outputting the plurality of adjustment values in a range of about −10° C. to about 10° C. based on the external temperature being less than a predetermined temperature.

8. A non-transitory computer-readable recording medium having recorded thereon a program for executing the method of claim 1.

9. An aerosol generating device comprising:
   at least one sensor configured to obtain an external temperature and an external humidity of the aerosol generating device;
   at least one memory storing instructions; and
   at least one processor operatively connected to the at least one memory, the at least one processor being configured to execute the instructions to:
      determine a temperature profile of a heater by determining one of a plurality of temperature profiles according to a combination of the external temperature and the external humidity;
      output a plurality of adjustment values, determine an adjustment value from among the plurality of adjustment values based on a user input, and fine-tune the determined temperature profile based on the determined adjustment value; and
      control power supplied to the heater based on the fine-tuned temperature profile,
   wherein at least one of the temperature profile and the plurality of adjustment values is determined according to at least one of the external temperature and the external humidity.

10. The aerosol generating device of claim 9, wherein the at least one processor is further configured to execute the instructions to determine the plurality of adjustment values according to the combination of the external temperature and humidity.

11. The aerosol generating device of claim 9, wherein the at least one processor is further configured to execute the instructions to:
   determine the temperature profile according to the external temperature, and
   determine the plurality of adjustment values according to the external humidity.

12. The aerosol generating device of claim 9, wherein the at least one processor is further configured to execute the instructions to:
  determine the temperature profile according to the external humidity, and
  determine the plurality of adjustment values according to the external temperature.

13. The aerosol generating device of claim 9, wherein the at least one processor is further configured to execute the instructions to output the plurality of adjustment values in a range of about −2° C. to about 2° C. based on the external temperature being greater than a predetermined temperature.

* * * * *